UNITED STATES PATENT OFFICE.

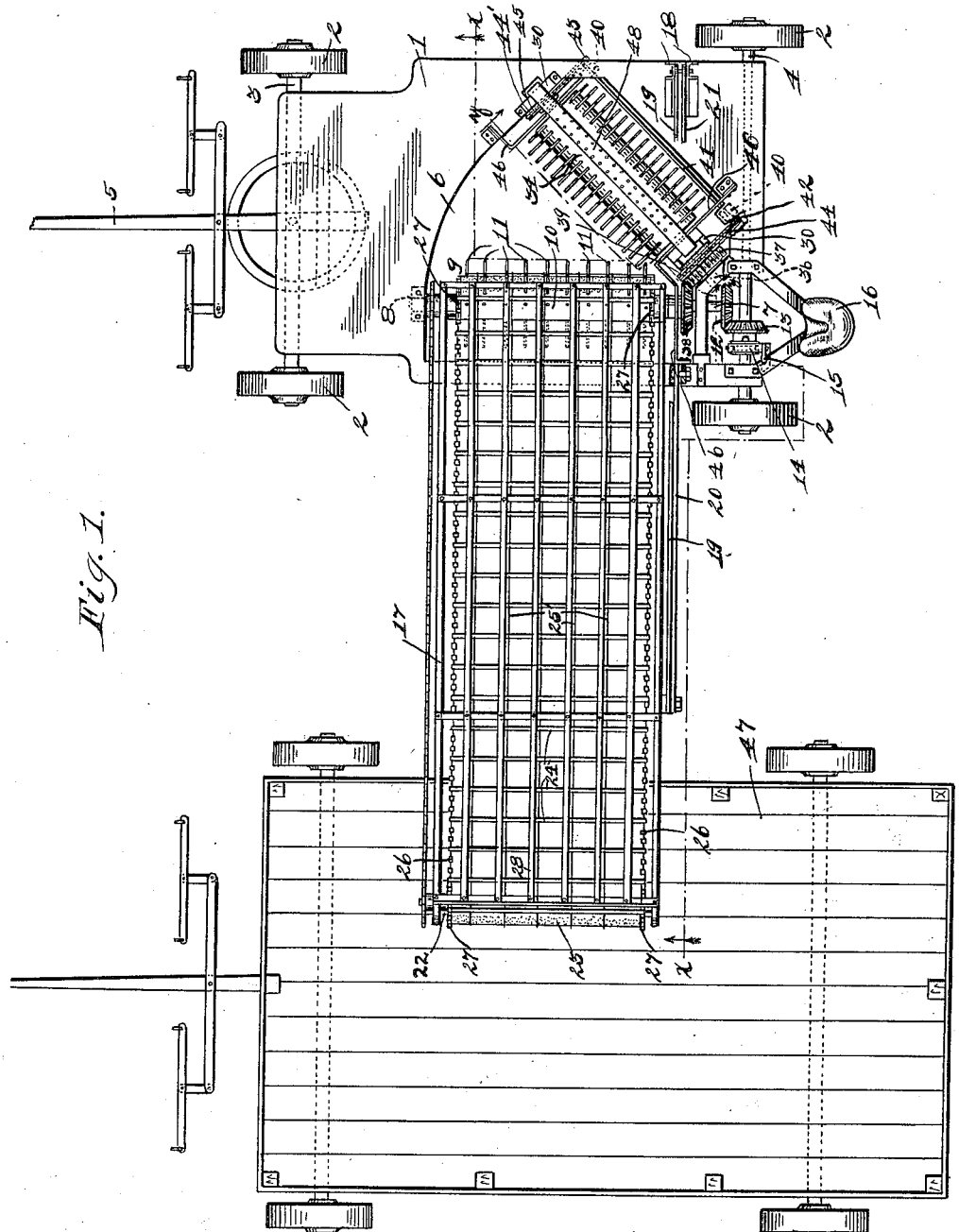

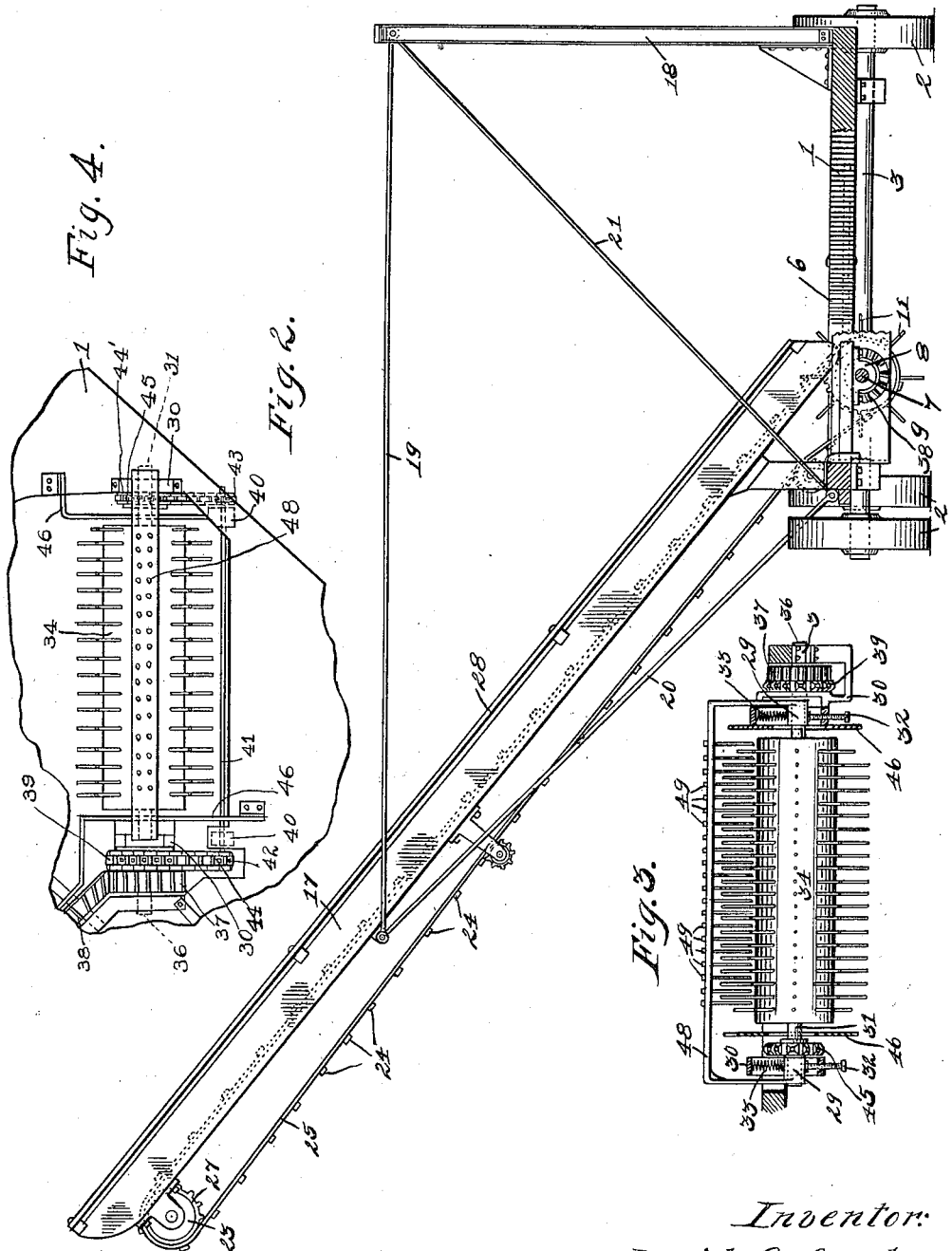

DAVID C. CROOK, OF MINOOKA, ILLINOIS.

HAY-LOADER.

1,036,458.      Specification of Letters Patent.      Patented Aug. 20, 1912.

Application filed April 25, 1910. Serial No. 557,491.

*To all whom it may concern:*

Be it known that I, DAVID C. CROOK, a citizen of the United States, residing at Minooka, county of Grundy, and State of Illinois, have invented certain new and useful Improvements in Hay-Loaders, of which the following is a specification.

My invention relates to agricultural machinery and more specifically to improvements in hay loading devices.

The object of my invention is the provision of a device of this character which will be adapted, upon being properly drawn over a field of mown hay, preferably such as is arranged in windrows, to rake the same from the ground and to deliver it to an adjacently positioned wagon or hay rack drawn co-incidentally therewith.

A further object is the provision of a device of the character mentioned which will be of durable and economical construction and effective in operation. Other objects will appear hereinafter.

With these objects in view, my invention consists in a hay loading device characterized as above mentioned and in certain details of construction and arrangement of parts all as will be hereinafter fully described and more particularly pointed out in the appended claims.

My invention will be more readily understood by reference to the accompanying drawings forming a part of this specification, and in which, Figure 1 is a top plan view of a hay loader embodying the preferred form of my invention, a hay-receiving wagon or hay rack being shown in conjunction therewith. Fig. 2 is a slightly enlarged vertical sectional detail taken on line *x—x* of Fig. 1, and Fig. 3 is a slightly enlarged sectional detail taken on line *y—y* of Fig. 1.

Referring now to the drawings, 1 indicates the body or supporting frame of the device which is suitably mounted upon wheels 2, the latter being carried by the front and rear axles 3 and 4 respectively, 5 indicating the draft tongue. The body 1 is constituted in a substantially horizontally disposed plate, preferably of metal in which is provided a substantially centrally positioned opening 6. Arranged in the opening 6 at one side thereof in a line longitudinally extending relatively to the sides of the body 1, the shaft 7 thereof being journaled in bearings 8 provided upon the under side of the body 1, is a rotary rake 9 comprising a cylinder or drum 10 and radially projecting fingers or teeth 11; the said rake being so mounted that, when rotating, the outer extremities of said fingers will pass in close proximity to the ground. Fixed to the rearward extremity of the shaft 7 is a beveled gear 12 which meshes with a beveled gear 13 carried by the rear axle 4. Operative connection between the gear 13 and said axle, and hence between said axle and said rake 9, is established through the medium of a clutch 14, the actuating lever 15 of said clutch projecting in operative proximity with an operator's or driver's seat 16 mounted at the rear extremity of said body.

17 indicates a conveyer supporting frame, the same registering at its lower extremity with the upper side of the rake 9 and projecting obliquely upwardly and outwardly therefrom or laterally from the body 1 to a considerable extent, as shown. In order to rigidly support said frame in such position, a braced upright 18 is provided, the upper extremity thereof being connected by means of a rod 19 with the rearward side of said frame intermediate its extremities. Rods 20 and 21 anchored at their lower extremities to the body 1 and connected at their upper extremities to the frame 17 and the upright 18 respectively, serve in an obvious capacity. Rotatably mounted in the upper extremity of the frame 17 is a shaft 22 upon which is secured a drum 23. Traveling around said drum and rake drum is an endless flexible conveyer, the latter being comprised of transversely extending spaced slats 24 and longitudinally extending connecting elements, preferably wires, 25. Sprocket chains 26 secured to the edges of said conveyer, traveling around sprocket wheels 27 carried at the extremities of the drums 10 and 23 insure a positive driving of said conveyer by the drum 10.

28 indicates a latticed frame which is supported upon the frame 17 in a position spaced slightly above the upper side of the conveyer, the same serving to retain the hay in close proximity with the conveyer during the operation of the device.

Having its extremities journaled in bearing blocks 29 mounted for vertical adjustment in brackets 30 rigidly secured to the body 1 is an obliquely disposed shaft 31, vertical adjustment of said blocks and hence of said shaft being effected by means of screws 32 threaded in the lower portions of said brackets, the upper extremities of said screws engaging the under sides of said blocks. Compression springs 34 serve to hold said bearing blocks in engagement with said adjusting screws. With this arrangement it is clear that in order to vertically adjust said shaft 31 it is only required to rotate said screws. Carried by the shaft 31 is a rotary rake 34 similar in construction to that of the rotary rake 9 before described; said rake 34 being so mounted that, upon rotation thereof, the outer extremities of the fingers comprised therein which pass in close proximity to the surface of the ground. By means of the screws 32 the proximity of said fingers to the ground may evidently be varied as conditions require.

Rotatably mounted on the under side of the body 1 is a stud shaft 36. Fixed to said shaft is a gear 37 which meshes with a beveled gear 38 fixed to the shaft 7. Also fixed upon the shaft 36 is a sprocket wheel 39. Arranged rearward of and parallel to the shaft 31, the same being mounted in bearings 40 secured to the under side of the body 1, is a countershaft 41. Fixed to the ends of said shaft 41 are sprocket wheels 42 and 43, the former being connected by means of a sprocket chain 44 with the sprocket wheel 39, the latter being connected by means of a sprocket chain 44′ with a coplanar sprocket wheel 45 fixed to the shaft 31. Thus an operative connection is established between the shafts 7 and 31 and hence between the former and the rake 34.

In order to guard the various gears, sprockets, and chains against contact of the hay therewith and consequent tangling of the same therein, the former are protected by vertically disposed plates 46, secured to the body 1, said plates also serving as means for deflecting the hay and for guiding it in the proper direction, from the rake 34 toward the rate 9.

The operation of the machine is as follows: The same is drawn over a field of mown hay whereon the latter is arranged preferably in windrows, the same being drawn in a direction the same as the longitudinal extent of the windrows and in such a position relative to the latter, that the rake 34 will collect the hay of a windrow. Said rake 34 is rotated in such a direction as to direct the hay engaged thereby toward the rake 9, the latter delivering the same to the conveyer whence it is carried and deposited into a hay rack 47 which is drawn parallel with the machine at one side thereof. In order to prevent gathering or collecting of the hay upon the rake 34, a toothed hay-remover frame 48 is provided. Said frame is secured at its respective ends to the bearing blocks 29, and whereby simultaneous movement thereof with the rake 34 is effected, the teeth or inwardly projecting fingers 49 of the former being interjacently positioned with the projecting fingers of said rake, as clearly shown in Fig. 3.

With a device of the construction as set forth the gathering of hay from the ground and the loading thereof upon a hay rack for transportation becomes a comparatively easy task; the device being thorough in its operation and easily operated.

While I have shown what I deem to be the preferable form of my device I do not wish to be limited thereto as there might be various changes made in the details of construction and the arrangement of parts described without departing from the spirit of the invention comprehended within the scope of the appended claims.

Having described my invention what I claim as new and desire to secure by Letters Patent is:

1. A hay loader comprising a wheeled body, the rear axle of said body being connected for driving by the wheels carried thereby; a rotary rake mounted in said body; a gear connection between said rake and said axle; a clutch included in said connection, the axis of said rake being horizontally disposed, the same extending substantially parallel with the direction of the line of movement of said body; an endless conveyer operatively connected with said rake, the same extending upwardly and laterally from said rake; a second obliquely disposed rotary rake mounted in said body and adapted to deliver hay collected thereby toward said first-named rake; bearing blocks for the journals of said second-named rake mounted for vertical adjustment in said body; springs arranged to hold said bearing blocks normally in depressed positions; and an operative connection between said rakes permitting of vertical adjustment of said second-named rake, substantially as described.

2. A hay loader comprising a wheeled body, the rear axle of said body being connected for driving by the wheels carried thereby; a rotary rake mounted in said body; a gear connection between said rake and said axle; a clutch included in said connection, the axis of said rake being horizontally disposed, the same extending substantially parallel with the direction of the line movement of said body; an endless conveyer operatively connected with said rake, the same extending upwardly and laterally from said rake; a second obliquely disposed rotary rake mounted in said body and adapted to deliver hay collected thereby toward said first named rake; bearing blocks for the journals in said second named rake mounted for vertical adjustment in said body; a stud shaft in said body arranged parallel with said second named rake and geared to said first named rake; a counter shaft arranged parallel with said second named rake; a sprocket wheel and chain connection between said stud shaft and said counter shaft; and a sprocket wheel and chain connection between said counter shaft and said second named rake, substantially as described.

In testimony whereof I have signed my name to this specification in the presence of two subscribing witnesses.

DAVID C. CROOK.

Witnesses:
 JOHN W. CROOK,
 ALEX BELL.

Copies of this patent may be obtained for five cents each, by addressing the "Commissioner of Patents, Washington, D. C."